US007216013B2

(12) United States Patent
Kibbler

(10) Patent No.: US 7,216,013 B2
(45) Date of Patent: May 8, 2007

(54) SINGULATION DETECTION SYSTEM FOR OBJECTS USED IN CONJUNCTION WITH A CONVEYOR SYSTEM

(75) Inventor: Kyle E. Kibbler, Binghamton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 99 days.

(21) Appl. No.: 11/209,521

(22) Filed: Aug. 23, 2005

(65) Prior Publication Data

US 2005/0278193 A1 Dec. 15, 2005

Related U.S. Application Data

(62) Division of application No. 10/215,502, filed on Aug. 9, 2002, now Pat. No. 7,012,210.

(51) Int. Cl.
*G06F 7/00* (2006.01)

(52) U.S. Cl. ....................................... 700/229; 198/444

(58) Field of Classification Search ................ 700/213, 700/214, 215, 219, 223, 225, 226, 229, 230; 198/340, 340.1, 444, 446, 459.1; 209/583, 209/584, 579, 900, 939

See application file for complete search history.

(56) References Cited

U.S. PATENT DOCUMENTS

| | | | | |
|---|---|---|---|---|
| 3,592,326 | A | 7/1971 | Zimmerle et al. | 198/33 |
| 3,647,203 | A | 3/1972 | De Hart | 271/30 A |
| 3,757,942 | A | 9/1973 | Gunn | 209/11.5 |
| 3,822,009 | A | 7/1974 | Richards | 198/40 |
| 3,872,964 | A | 3/1975 | Higgins | 198/232 |
| 4,031,402 | A | 6/1977 | Dlugos et al. | 250/557 |
| 4,150,743 | A | 4/1979 | Lazzarotti et al. | 198/460 |
| 4,227,607 | A | 10/1980 | Malavenda | 198/460 |
| 4,314,644 | A | 2/1982 | Stocker | 209/569 |
| 4,360,108 | A | 11/1982 | Logothetis | 209/598 |
| 4,494,655 | A | 1/1985 | Horii et al. | 209/569 |
| 4,503,977 | A | 3/1985 | Kohno et al. | 209/564 |
| 4,518,075 | A | 5/1985 | Aykut et al. | 198/460 |
| 4,601,396 | A | 7/1986 | Pavie | 209/569 |
| 4,634,328 | A | 1/1987 | Carrell | 414/117 |
| 4,711,357 | A | 12/1987 | Langenbeck et al. | 209/565 |
| 4,867,430 | A | 9/1989 | Volat | 271/2 |
| 5,022,644 | A | 6/1991 | Bürge | 271/270 |
| 5,092,451 | A | 3/1992 | Jones et al. | 198/460 |
| 5,141,097 | A | 8/1992 | Oiry et al. | 198/460 |
| 5,165,520 | A | 11/1992 | Hervé et al. | 198/460 |
| 5,201,397 | A | 4/1993 | Isaacs | 198/395 |
| 5,295,571 | A | 3/1994 | Van Den Bogaert et al. | 198/502.1 |
| 5,322,154 | A | 6/1994 | Lenherr | 198/460 |
| 5,341,916 | A | 8/1994 | Doane et al. | 198/460 |
| 5,480,032 | A | 1/1996 | Pippin et al. | 209/583 |
| 5,562,195 | A | 10/1996 | Isaacs | 198/460.1 |

(Continued)

*Primary Examiner*—Khoi H. Tran
(74) *Attorney, Agent, or Firm*—Burns & Levinson LLP; Jacob N. Erlich

(57) ABSTRACT

A system and method for reliably detecting singulated parcels traveling on a conveyor belt by comparing parcel characteristics before and after parcel agitation. First, parcel characteristics are evaluated. Then parcels are agitated to promote a change in characteristics, for example volume or dimensions, of the unsingulated parcels. Next, parcel characteristics are again evaluated and compared to the previously-evaluated characteristics. If there is no appreciable difference in characteristics, the parcel is deemed singulated.

16 Claims, 7 Drawing Sheets

U.S. PATENT DOCUMENTS

| | | | | |
|---|---|---|---|---|
| 5,638,938 | A | 6/1997 | Lazzarotti et al. | 198/445.1 |
| 5,641,052 | A | 6/1997 | Lazzarotti et al. | 198/445 |
| 5,655,667 | A | 8/1997 | Isaacs | 209/539 |
| 5,711,410 | A | 1/1998 | Cai et al. | 198/460.1 |
| 5,719,678 | A | 2/1998 | Reynolds et al. | 356/379 |
| 5,738,202 | A | 4/1998 | Ydoate et al. | 198/460.1 |
| 5,740,901 | A | 4/1998 | Lazzarotti et al. | 198/444 |
| 5,753,866 | A | 5/1998 | Ikeda et al. | 177/25.18 |
| 5,796,052 | A | 8/1998 | Christmann | 177/145 |
| 6,023,034 | A | 2/2000 | Nakajima et al. | 209/584 |
| 6,135,292 | A | 10/2000 | Pettner | 209/603 |
| 6,226,081 | B1 | 5/2001 | Fantone et al. | 356/239.6 |
| 6,471,044 | B1 | 10/2002 | Isaacs et al. | 198/809 |
| 6,484,886 | B1 | 11/2002 | Isaacs et al. | 209/539 |
| 6,629,018 | B2 * | 9/2003 | Mondie et al. | 700/228 |
| 6,944,324 | B2 * | 9/2005 | Tran et al. | 382/143 |
| 7,012,210 | B2 * | 3/2006 | Kibbler et al. | 209/583 |
| 2005/0259847 | A1 * | 11/2005 | Genc et al. | 382/103 |

* cited by examiner

SINGULATION DETECTION SYSTEM FOR OBJECTS USED IN CONJUNCTION WITH A CONVEYOR SYSTEM

CROSS REFERENCE TO RELATED APPLICATIONS

The present application is a divisional application of U.S. patent application Ser. No. 10/215,502 (now U.S. Pat. No. 7,012,210), entitled SINGULATION DETECTION SYSTEM FOR OBJECTS USED IN CONJUNCTION WITH A CONVEYOR SYSTEM filed on Aug. 9, 2002 and incorporated herein by reference.

BACKGROUND OF THE INVENTION

This invention relates generally to singulation detection, and, more particularly to a system to reliably detect if parcels are singulated.

In the past, parcels, such as packages traveling through the U.S. mail, were transported by a single conveyor belt to an automatic sorter. Each parcel could be labeled with a machine-readable bar code sticker, for example, but in the systems of the past, an attendant would have to orient the parcel so that the label could be detected and read by the sorter. To complicate the systems, often parcels were delivered to the sorter in bunches, making them difficult to handle and sometimes creating jams. Manual intervention would be required to perform a process known as singulation, or separation of the parcels from each other, to enable the automatic sorter to operate correctly so that the parcels could be properly distributed. Due to the non-uniform shape and size of parcels, this effort was time-consuming and cumbersome to the operating attendant.

Automated package delivery systems such as mail processing systems now include automatic parcel singulation systems. These systems usually separate parcels, bundles, and other packages one from another to prepare them for automated distribution. But when the parcels are stacked or lying too close together, an automated system cannot always reliably singulate the parcels for proper sorting because a group of parcels can be seen as one parcel by the automatic system.

Machines that address the problem of reliable singulation can include a singulator, a side-by-side remover, a flow controller, and a recirculating conveyer. In this type of equipment, parcels enter the singulator through an infeed and are driven to one side by skewed rollers. Successive belts increase in speed and create spaces between the packages. The skewed rollers align the packages to one side of the unit to form a straight line. A typical side-by-side remover transports downstream any packages of the width of the narrowest package while deviating other packages to be recirculated back onto the singulator. In some systems, the side-by-side remover is augmented by an optical recognition system that detects "piggy-back" items. Packages that are transported downstream enter a flow controller that meters the rate of packages that it discharges by inserting gaps between packages. Doubles and overflow packages are pulled off the flow controller belt and recirculated to the infeed of the singulator by the recirculating conveyor. Sometimes these automated systems use dimensioning equipment which automatically measures the external characteristics of parcels as they move along a conveyor.

The current systems are deficient, however, when it comes to reliably identifying improperly singulated articles. What is needed is a system that decreases the likelihood that parcels are determined to be singulated when in fact they are not.

SUMMARY OF THE INVENTION

The problems set forth above as well as further and other problems are solved by the present invention. The solutions and advantages of the present invention are achieved by the illustrative embodiment of the present invention described hereinbelow.

The parcel singulation detection system of the present invention subjects at least one parcel group to an agitation device and then tests if the parcels have been separated from one another (singulated). At least one parcel group containing at least one parcel enters the system of the present invention and is identified. Its initial parcel group characteristics are evaluated, and it is subjected to agitation. After the parcel group is subjected to agitation, it is again identified and its current parcel group characteristics are evaluated. A controller compares initial and current characteristics to determine if the at least one parcel has been singulated from the identified at least one parcel group.

The parcel singulation detection system of the present invention includes a transport subsystem, a parcel order subsystem, an evaluation subsystem, an agitation subsystem, and a controller. The transport subsystem is capable of receiving and moving the parcel group(s). The evaluation subsystem is capable of evaluating initial characteristics and current characteristics of the parcel group(s). The agitation subsystem is capable of subjecting the parcel group(s) to agitation. The agitation subsystem is capable of modifying the initial characteristics of the parcel group(s). The parcel order subsystem is capable of associating a parcel order number with the parcel group(s) and any parcels that are separated from the parcel group(s) as a result of agitation. The controller is capable of receiving the initial characteristics and the current characteristics from the evaluation subsystem for the parcel group(s) or parcel identified by the parcel order subsystem with a parcel order number. Further, the controller is capable of computing an absolute value of the difference between the current characteristics and the initial characteristics, and is capable of computing a comparison value as a function of comparing the absolute value to a predetermined threshold. The controller is capable of setting a "singulation status" as a function of the comparison value.

The transport subsystem includes, for example, but is not limited to, a transport device having an intake area and an output area. The transport device moves at least one parcel group from the intake area to the output area. The transport device, for example, can be a conveyor belt, motorized rollers, etc., having a pre-selected length dimension and a pre-selected width dimension.

The evaluation subsystem can include, for example, a first evaluation device that evaluates the initial characteristics of the parcel group(s), possibly at the intake area, and at least one subsequent evaluation device that evaluates the current characteristics of the parcel group(s) temporally after the first evaluation device evaluates the initial characteristics, possibly between the intake area and the output area. The first evaluation device and the subsequent evaluation device(s) may each be, for example, a conventional light curtain, a laser based scanner, or any other type of automated parcel characteristics evaluation equipment. Characteristics can include dimensions of the parcel group as well as its location and position relative to surrounding parcels.

The agitation subsystem can include at least one agitation device positioned between the intake area and the output area. The agitation device(s) can be, among other things, a conventional fixed paddle or a conventional herringbone roller module.

The parcel order subsystem can include, among other things, a plurality of conventional photo cells capable of associating the parcel order number with the parcel group(s). Each of the photo cells is capable of associating a "lost" or "found" indicator with the parcel group(s) in the conventional way as follows. The photo cells determine the expected time when the parcel group(s) should pass a next subsequent photo cell. If a parcel group does not arrive at the next subsequent photo cell at expected time, either because there are multiple parcels arriving, no parcels arriving, or parcels arriving early or late, the parcel order subsystem processes the situation accordingly by associating "lost" or "found" indicators with the parcel, and creating a new parcel data block and assigning new parcel order numbers when appropriate.

The controller includes, but is not limited to, a data collection system and a comparator system. The data collection system is capable of receiving collected data such as initial characteristics, current characteristics, parcel order number, and parcel timing information, and perhaps stores these data for later reference in, for example, a parcel data block. The comparator system can identify a particular parcel by parcel order number and can compute an absolute value of a difference between the initial characteristics and the current characteristics of the particular parcel to determine if the parcel is singulated from a parcel group. If the absolute value of the difference is less than a threshold value, the singulation status associated with the parcel is set to singulated.

In operation, when the parcel group enters the system, the transport subsystem moves the parcel group past the parcel order subsystem. The parcel order subsystem tracks the parcel group through the system so that the evaluation subsystem can associate any characteristics it evaluates with the proper parcel group. The agitation subsystem is capable of separating the parcels in the parcel group from each other, thus requiring the parcel order subsystem to manage the ordering of parcels after agitation so that the evaluation subsystem can properly associate any subsequent characteristics it evaluates with the proper parcel.

After the parcel group passes the parcel order subsystem, the transport subsystem moves the parcel past the evaluation subsystem. The evaluation subsystem first computes initial characteristics and then, later, computes current characteristics.

Next the transport subsystem moves the parcel group(s) past the agitation subsystem. The agitation subsystem subjects the parcel group(s) to agitation to possibly change the characteristics of the parcel group(s). During all these steps, the controller can collect data including initial characteristics, current characteristics, and parcel tracking information. The controller can compute a singulation status for each parcel group as a function of the data collected by the controller. The controller associates the singulation status with each parcel group, and transmits the singulation status to any subsequent parcel processing system, perhaps a subsequent system such as a shoe sorter system (not part of this invention).

The method of the present invention includes the steps of identifying at least one parcel group and evaluating initial characteristics of the parcel group. The method further includes the steps subjecting at parcel group to agitation and testing for parcel order change. If the parcel order has changed, the method includes the step of associating a new parcel order and lost/found indicators with any lost/found parcels. The method further includes the steps of evaluating current characteristics of the parcel group and any found parcels and testing the absolute value of a threshold value against a difference between the current characteristics and the initial characteristics. If the difference is less than or equal to the threshold, the method includes the step of setting a singulation status to singulated. If the difference is greater than the threshold, the method includes the step of setting the singulation status to not singulated. Optionally, if the system includes more than one subsequent evaluation device (such as a dimensioner), the method can include the step of repeating the identifying, evaluating, agitating, testing, and status setting for each evaluation device in the system.

The method of the illustrative embodiment of the present invention can optionally include the steps of creating a parcel data block, storing the initial and current characteristics in the parcel data block, and storing the singulation status in the parcel data block. The step of identifying can optionally further include the steps of storing a parcel order number in the parcel data block and tracking the parcel group and the lost/found parcels by the parcel order number.

The method of the illustrative embodiment of the present invention can optionally include the step of configuring a transport device, such as a conveyor belt, which has a length dimension and a direction of travel and the capability to move the parcel group along the direction of travel. The method can further optionally include the step of configuring a first evaluation device, at least one subsequent evaluation device, a first parcel order device, at least one subsequent parcel order device, and at least one agitation device, all situated along the length dimension of the transport device.

For a better understanding of the present invention, together with other and further objects thereof, reference is made to the accompanying drawings and detailed description. The scope of the present invention is pointed out in the appended claims.

DETAILED DESCRIPTION OF THE INVENTION

The present invention is now described more fully hereinafter with reference to the accompanying drawings, in which the illustrative embodiment of the present invention and an example of an alternate embodiment of the present invention are shown.

Figure 1:
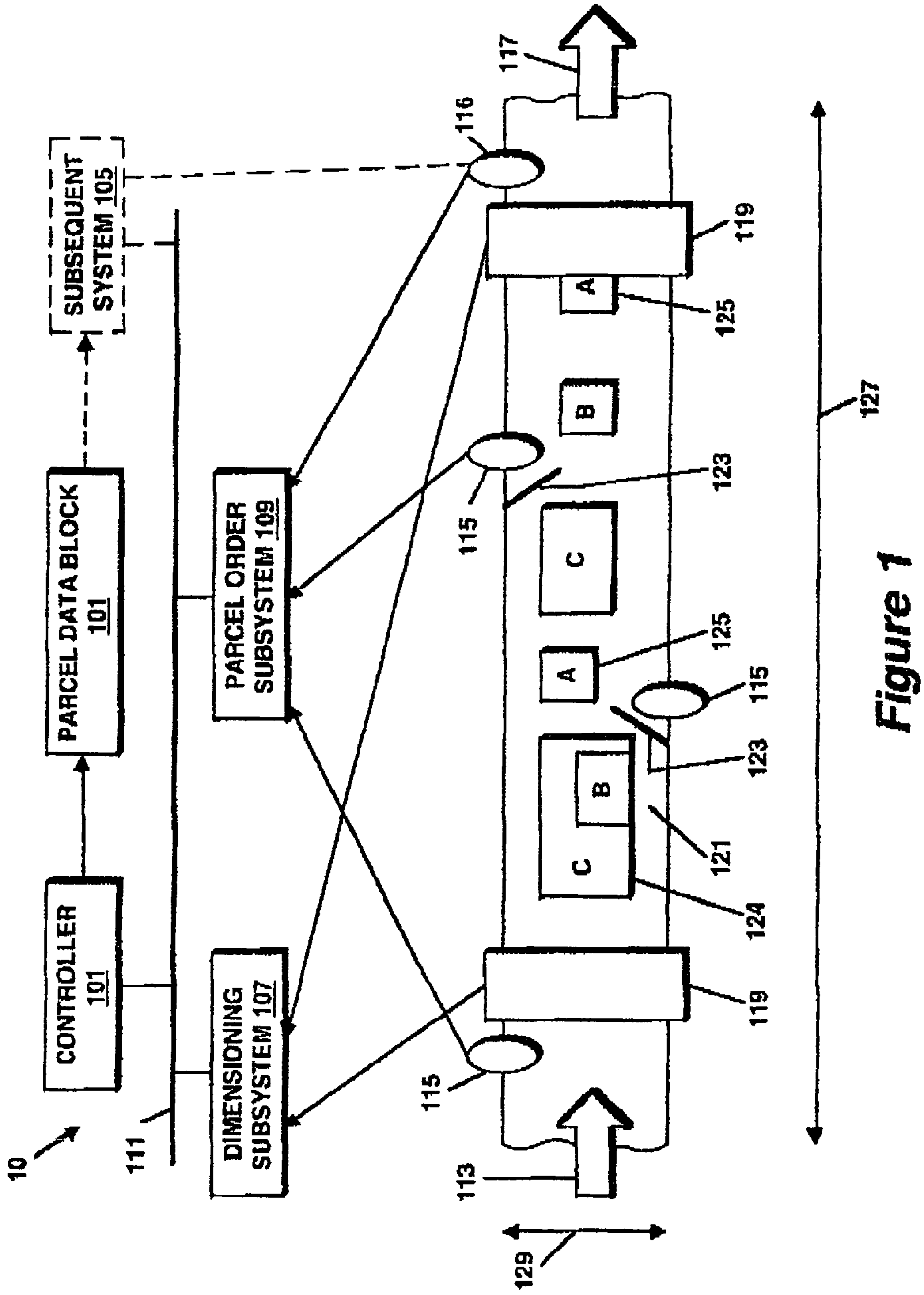
FIG. 1 is a schematic representation of the parcel singulation detection system of the illustrative embodiment of the present invention.

The system of the illustrative embodiment of the present invention is generally indicated by numerical designation 10 as shown in FIG. 1. System 10 generally includes controller 101, evaluation or dimensioning subsystem 107, parcel order subsystem 109, transport subsystem shown here as conventional conveyor belt 121, and agitation subsystem shown here as conventional agitators 123. Dimensioning subsystem 107 includes, but is not limited to, conventional dimensioners 119, and parcel order subsystem includes, but is not limited to, conventional photo cells 115. The dimensioners 119, agitators 123, and photo cells 115 are operably positioned along length dimension 127 of conveyor belt 121.

Parcel groups 124/125 enter system 10 of the present invention at intake area 113 having conveyor belt width dimension 129. As parcel groups 124/125 enter system 10, conveyor belt 121 moves them in a direction of travel past photo cells 115, dimensioners 119, and agitators 123. A first photo cell 115 establishes a parcel group order number of the passing parcel groups 124/125 and establishes an expected time at which the next photo cell 115 should expect to see those particular parcel groups. Initial characteristics (referred to herein as "initial measurements") of passing parcel groups 124/125 are evaluated by a first evaluation device or dimensioner 119.

Figure 2:
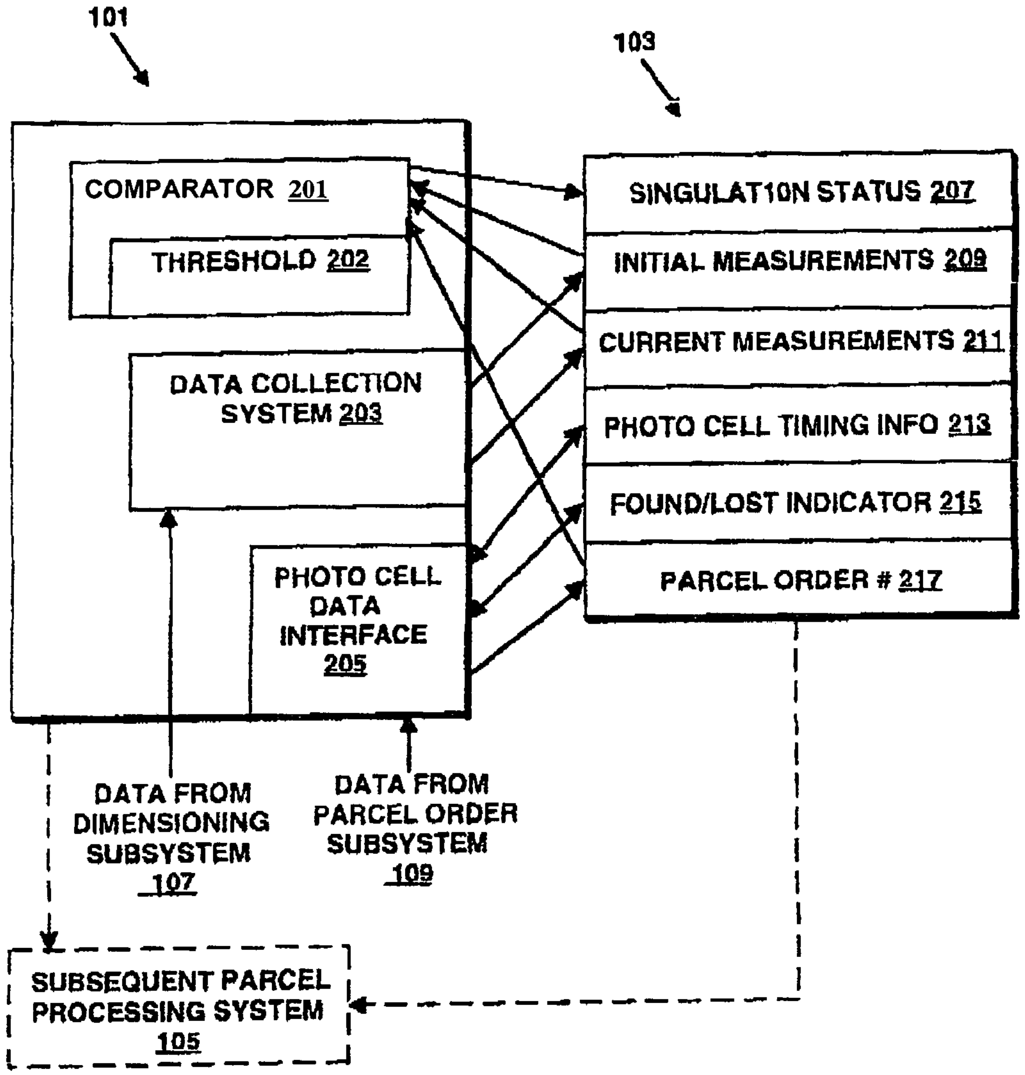
FIG. 2 is a schematic block diagram of the collection system and parcel data block of the illustrative embodiment of the present invention.

Referring now to FIGS. 1 and 2, time-lapse positions of passing parcel groups 124/125 are shown at two different times (in FIG. 1), a first time before agitation and a second time after agitation. As shown in FIG. 1, after parcel group 124, which includes parcels B and C, is agitated, it is no longer an intact parcel group, but instead parcels B and C are singulated. The first photo cell 115 has set an expected time 213 (see FIG. 2) in parcel data block 103 for the B/C parcel group to pass the next photo cell 115. Since the parcel group has now been separated, parcels B and C are seen separately. It is possible that neither will pass photo cell 115 at the expected time 213. In this case, photo cell 115 could, in new parcel data blocks 103 created for parcels B and C, associate "found" indicators 215 and new parcel order numbers 217 with parcels B and C. Photo cell 115 could associate a "lost" indicator 215 with parcel group 124 in the parcel data block 103 for parcel group 124. If parcels B and C are "found" in this way, their initial measurements 209 are computed by any dimensioner 119 that first evaluates their characteristics as autonomous parcels and stores their physical characteristic data (referred to in FIG. 2 as "initial measurements") in the parcel data blocks 103 created for them when they were "found".

Continuing to refer to FIGS. 1 and 2, the process of agitation should not substantially change the characteristics of parcel A. When its current characteristics or measurements 211 are taken for parcel A by dimensioner 119, they will not be substantially different from initial measurements 209 taken for parcel A, depending upon the tolerance of the equipment and the choice of threshold 202. Thus the controller 101, when comparing initial measurements 209 to current measurements 211 for parcel A, can associate a singulation status 207 of singulated with parcel A because the absolute value of the difference between the two measurements is below a pre-determined threshold 202. After agitation, the controller 101 will not, depending again upon the equipment, reach the same result with parcels B and C, since these parcels have no current measurements 211 stored in their parcel data blocks 103 with which to compare their initial measurements 209 taken after agitation. Thus, such a comparison will fail. A singulation status 207 of not singulated will probably be associated with parcels B and C. Note that the choice of equipment and threshold 202 can change the orientation of the singulation status 207 for the same parcel group.

As shown in FIG. 1, parcels, singulated or not, pass by shared photo cell 116 in the direction of output area 117. Parcel data information embodied in parcel data block 103 is distributed through a system such as, for example, network 111 to a subsequent system 105, which is not part of this invention, but which can share, by design, photo cell 116 and can receive parcel data block 103 through network 111.

Referring now to FIG. 2, controller 101 includes comparator 201, data collection system 203, and photo cell data interface 205. The controller 101 receives conventional parcel group ordering and timing information from photo cells 115 and 116 through photo cell data interface 205 and parcel group measurements through data collection system 203 from dimensioners 119. Comparator 201 can compare the evaluated initial and current characteristics (initial and current measurements (209/211)), and can determine, through initial and current characteristics comparisons (initial and current measurement comparisons) if parcels are singulated.

The illustrative embodiment dimensioner 119 is, for example, a conventional light curtain, such as, preferably, a Cargoscan CS5000/CS5000HS Measuring frame, or a conventional laser based scanner such as Mettler Toledo® CS5120 and CS5200, Accusort DM3000, or Adaptive Optics Associates® MSDS, all of which can be used to evaluate characteristics of parcel groups. Of particular interest in certain applications is the evaluation of characteristics such as Cargoscan's "R-value". This value indicates the deviation in shape between the parcel being evaluated and an ideal cubic shape. R-value is only one example of a characteristic that would be of value in singulation determination according to the present invention.

The conventional conveyor belt 121 of the illustrative embodiment of the present invention has a width dimension 129 and a length dimension 127 and a direction of travel from intake area 113 to output area 117, as indicated by large arrows in FIG. 1. Where a light curtain is used, dimensioners 119 are preferably positioned in predetermined gaps along the conveyor belt in order that the vertical portion of the light curtain, which measures width, is operational.

Agitators 123 of the illustrative embodiment can be conventional passive or active agitators, preferably fixed paddles such as the Pegasus Industrial Specialties Inc. ST1/2 or herringbone roller modules such as those manufactured by Ermanco.

The system of the illustrative embodiment of the present invention employs two conventional dimensioners 119 in tandem, surrounding two conventional agitators 123, on conventional conveyor 121 that is at least 5–10 feet long. However, this combination of components and dimensioners is presented for illustrative purposes only and may vary in accordance with the usage of the present invention.

Figure 3A:
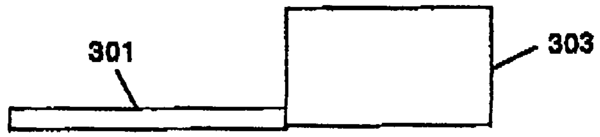
FIGS. 3A, 3B, and 3C are parcels groups shown in various orientations as examples of various configurations of parcels that could be agitated and tested for singulation status by the present invention.
Figure 3B:
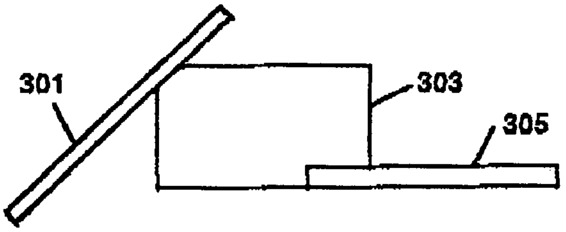
Figure 3C:
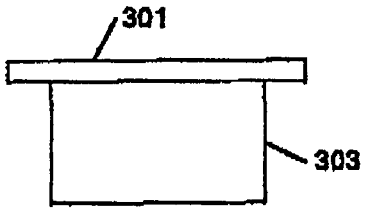

Non-singulated parcel groups are illustrated in FIGS. 3A, 3B, and 3C. FIG. 3A shows two parcels 301 and 303 side-by-side. Because there is no gap between the parcels, the dimensioner could consider them a single parcel. However, after proceeding through the agitators, parcels 301 and 303 could likely be separated. FIG. 3B illustrates a more complicated parcel group including three parcels, 301, 303, and 305. Although a single agitation might separate these three parcels from one another, more than one agitation might be required. FIG. 3C shows parcel 301 on top of parcel 303. Multiple agitations could be required in this case as well.

Figure 4:
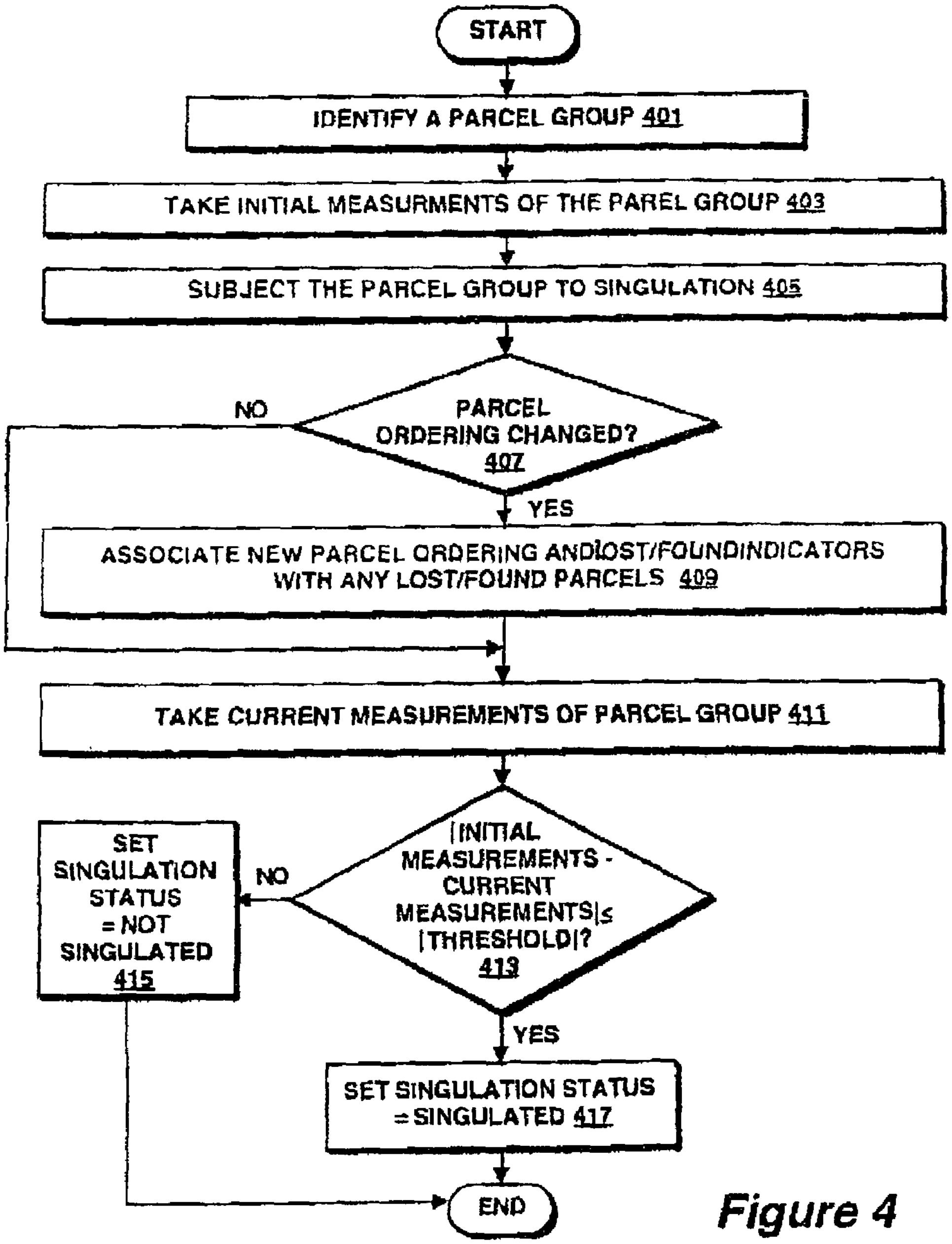
FIG. 4 is a flow chart of the method of the illustrative embodiment of the present invention.

Referring now to FIG. 4, the method of the illustrative embodiment of the present invention includes the steps of identifying a parcel group by establishing a parcel order number and an expected time of arrival at the next parcel ordering station (method step 401), evaluating initial characteristics, i.e. taking initial measurements of the identified parcel group (method step 403), and subjecting the parcel to agitation (method step 405). If the order of the parcels has changed, i.e. if the identified parcel group does not arrive at the next parcel ordering station at the expected time (decision step 407), a new parcel ordering is associated with the parcel group or parcel that does arrive at the next parcel ordering station and lost/found indicators are associated appropriately with parcels now known to the system (method step 409). In this case, the parcel is considered not singulated, and the process moves on to set the status accordingly (method step 415). If the parcel order has not changed, the method next includes the step of evaluating current characteristics, i.e. taking current measurements of the parcel group (method step 411). If the absolute difference between the initial measurements and the current measurements is greater than a threshold (decision step 413), then the method includes the step of setting the singulation status to not singulated (method step 415). Otherwise, the method includes the step of setting the singulation status to singulated (method step 417).

Figure 5:
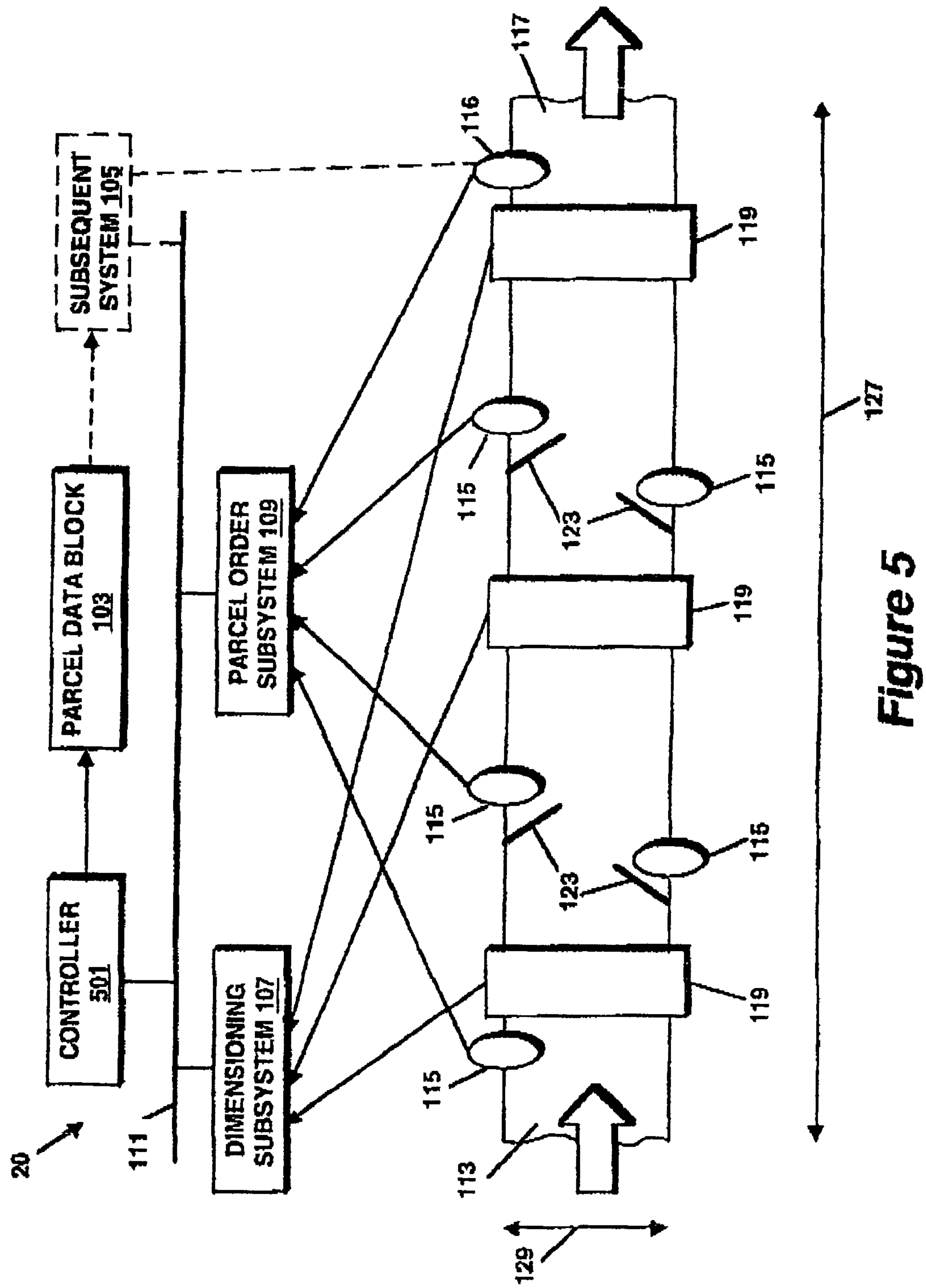
FIG. 5 is a schematic representation of the parcel singulation system of an alternate embodiment of the present invention in which there are multiple evaluation devices.

FIG. 5 illustrates an alternate embodiment (system 20) in which are shown an additional dimensioner 119 and additional agitators 123 along conveyor belt 121. The system 20 generally includes at least three conventional dimensioners 119, and at least two conventional agitator pairs 123. Though three evaluation devices and two agitation devices are disclosed, any number of each can be used to configure a singulation detection device that achieves the primary objective of the system to jostle and separate objects through the use of agitation and detect separation through characteristic evaluation and parcel ordering. Controller 501 is enhanced to receive data from additional dimensioners. The remaining system components have the same function as the illustrative embodiment depicted in FIG. 1.

Figure 5A:
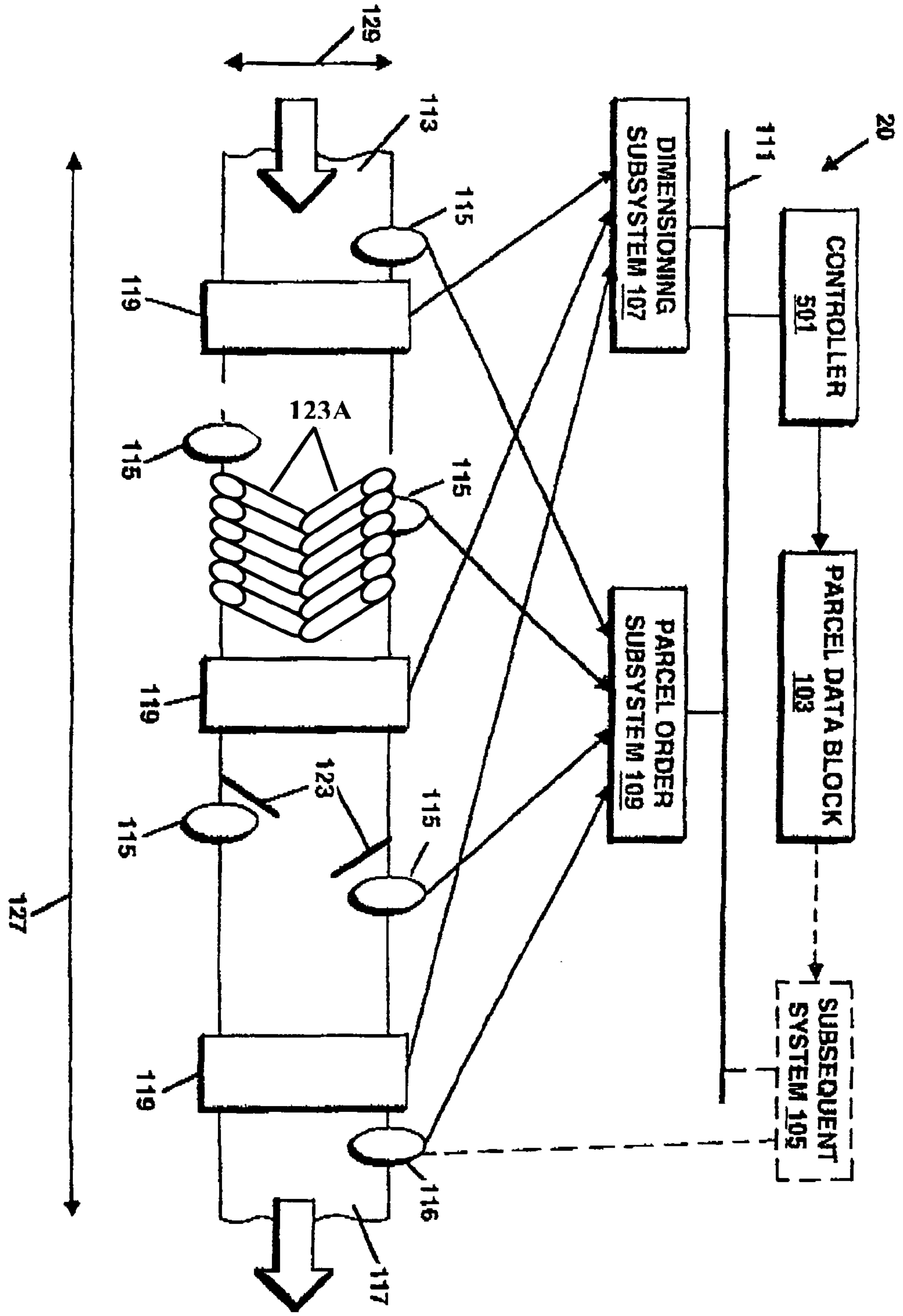
FIG. 5A is a schematic representation of the parcel singulation system of another alternative embodiment of the present invention in which there are multiple evaluation devices and a herringbone roller module.

FIG. 5A illustrates the embodiment of FIG. 5 with the addition of herringbone roller module 123A which can jostle and separate objects on conveyor belt 121.

Figure 6:
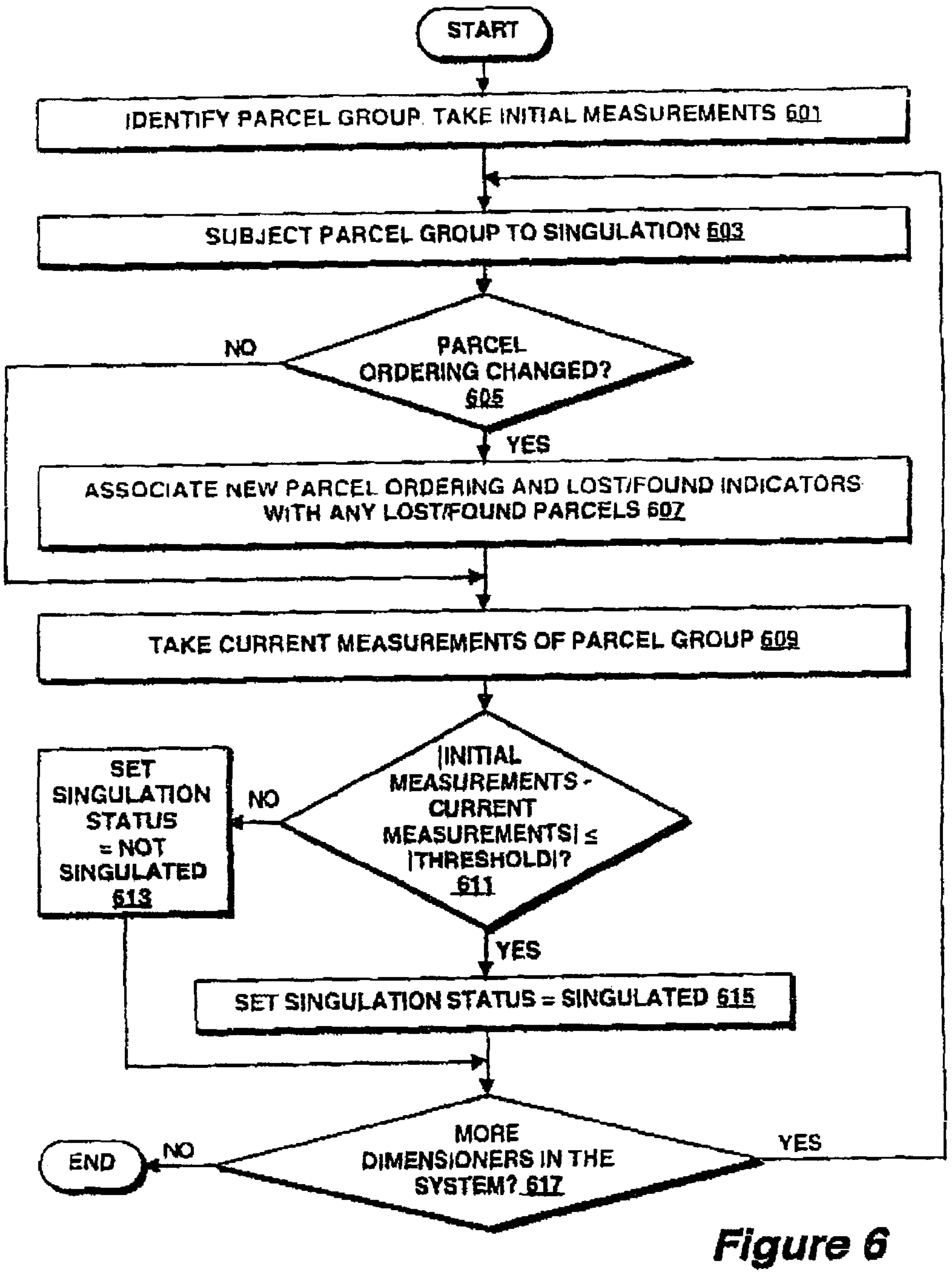
FIG. 6 is a flow chart of the method of the alternate embodiment of the present invention.

FIG. 6 is a flowchart of the method of use of the alternate embodiment of the present invention. The method includes the steps of identifying a parcel group and taking initial measurements (method step 601). Next the method includes the step of subjecting the parcel group to agitation (method step 603). If the parcel ordering has changed (decision step 605), the method includes the step of associating a new parcel ordering and lost/found indicators with any lost/found parcels (method step 607). In this case, the parcel is considered not singulated and the status is set accordingly (method step 613). If the parcel ordering has not changed, the method next includes the step of taking current measurements of parcel groups in the system (method step 609). If the absolute value of the difference between the initial measurements and the current measurements is less than or equal to a predetermined threshold (decision step 611), the method includes the step of setting a singulation status for the parcel group to singulated (method step 615). Otherwise, the method includes the step of setting the singulation status for the parcel group to not singulated (method step 613). If there are more evaluation devices in the system (decision step 617), method and decision steps 603–617 are repeated until there are no more evaluation devices in the system.

The method of the illustrative embodiment of the present invention may be, in whole or in part, automated through use of a computer program, which may be stored on computer-readable media. Common forms of computer-readable media include, for example, a floppy disk, a flexible disk, a hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A method to detect singulated parcels comprising the steps of:
identifying a parcel group;
evaluating prior characteristics of the parcel group including at least one parcel order indicator;
subjecting the parcel group to agitation;
evaluating subsequent characteristics of the parcel group;
associating a lost/found indicator with lost/found parcels that are part of the parcel group as determined by the at least one parcel order indicator; and
detecting if the parcel group is singulated as a function of a comparison between a predetermined threshold and the difference between the prior characteristics and the subsequent characteristics, and as a function of the lost/found indicator.

2. The method as in claim 1 further comprising the steps of:
creating a parcel data block;
storing the prior characteristics in the parcel data block;
storing the subsequent characteristics in the parcel data block; and
storing a singulation status in the parcel data block as a function of said step of detecting.

3. The method as in claim 2 further comprising the steps of:
storing the parcel order indicator in the parcel data block; and
tracking the parcel group and the lost/found parcels by the at least one parcel order indicator.

4. A method for parcel singulation detection for use with at least one parcel group comprising the steps of:
assigning a parcel ordering for the at least one parcel group;
subjecting the at least one parcel group to agitation;
detecting parcel ordering changes in the parcel ordering;
detecting characteristic changes in at least one characteristic of the at least one parcel group;
evaluating the parcel ordering changes and the characteristic changes over time;
comparing a result of said step of evaluating to at least one predetermined threshold; and
detecting if the at least one parcel group is singulated based on said step of comparing.

5. The method of claim 4 wherein said step of detecting parcel ordering changes comprises the step of:

associating a lost indicator with the at least one parcel group that is not located after said step of subjecting; and associating a found indicator with a parcel that is not associated with at least one parcel group after said step of subjecting.

6. The method of claim 4 wherein said step of detecting characteristic changes further comprises the step of:

sensing by a plurality of photo cells at least one of the at least one characteristic of the at least one parcel group.

7. The method of claim 4 wherein said step of subjecting comprises the step of:

providing passive agitation to the at least one parcel group.

8. The method of claim 4 wherein said step of subjecting comprises the step of:

providing active agitation to the at least one parcel group.

9. A system to detect singulated parcels comprising:

means for identifying a parcel group;

means for evaluating prior characteristics of said parcel group including at least one parcel order indicator;

means for subjecting said parcel group to agitation;

means for evaluating subsequent characteristics of said parcel group;

means for associating a lost/found indicator with lost/found parcels that are part of said parcel group as determined by the at least one parcel order indicator; and means for detecting if said parcel group is singulated as a function of a comparison between a predetermined threshold and the difference between said prior characteristics and said subsequent characteristics, and as a function of said lost/found indicator.

10. The system as in claim 9 further comprising:

means for creating a parcel data block;

means for storing said prior characteristics in said parcel data block;

means for storing said subsequent characteristics in said parcel data block; and means for storing a singulation status in said parcel data block as a function of said means for detecting.

11. The system as in claim 10 further comprising:

means for storing said at least one parcel order indicator in said parcel data block; and means for tracking said parcel group and said lost/found parcels by said at least one parcel order indicator.

12. A system for parcel singulation detection for use with at least one parcel group comprising:

means for assigning a parcel ordering for said at least one parcel group;

means for subjecting said at least one parcel group to agitation;

means for detecting parcel ordering changes in said parcel ordering;

means for detecting characteristic changes in at least one characteristic of said at least one parcel group;

means for evaluating said parcel ordering changes and said characteristic changes over time;

means for comparing a result of said means for evaluating to at least one predetermined threshold; and means for detecting if said at least one parcel group is singulated based on said means for comparing.

13. The system of claim 12 wherein said means for detecting parcel ordering changes comprises:

means for associating a lost indicator with said at least one parcel group that is not located after said means for subjecting; and means for associating a found indicator with a parcel that is not associated with said at least one parcel group after said means for subjecting.

14. The system of claim 12 wherein said means for detecting characteristic changes further comprises:

means for sensing by a plurality of photo cells at least one of said at least one characteristic of said at least one parcel group.

15. The system of claim 12 wherein said means for subjecting comprises:

means for providing passive agitation to said at least one parcel group.

16. The system of claim 12 wherein said means for subjecting comprises:

means for providing active agitation to said at least one parcel group.

* * * * *